E. D. MACKINTOSH.
MOTOR SUPPORT.
APPLICATION FILED OCT. 30, 1908.
1,011,129.
Patented Dec. 5, 1911.
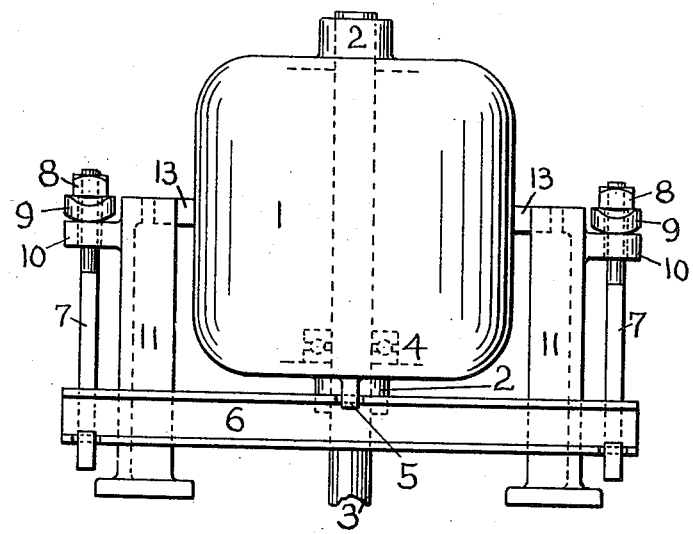
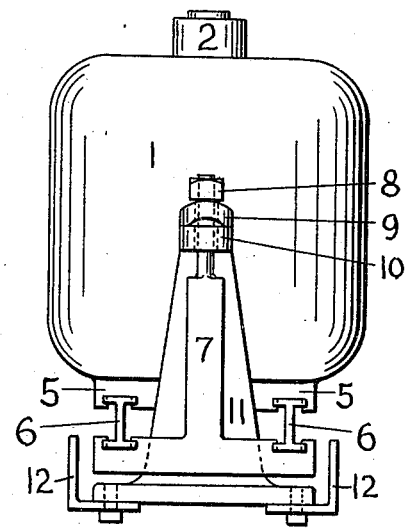
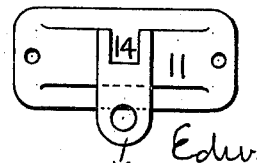
WITNESSES
Edward D. Mackintosh,
INVENTOR

UNITED STATES PATENT OFFICE.

EDWARD D. MACKINTOSH, OF NEW YORK, N. Y., ASSIGNOR OF ONE-HALF TO S. S. HEPWORTH COMPANY, OF NEW YORK, N. Y., A CORPORATION OF NEW YORK.

MOTOR-SUPPORT.

1,011,129.  Specification of Letters Patent.  Patented Dec. 5, 1911.

Application filed October 30, 1908. Serial No. 460,351.

*To all whom it may concern:*

Be it known that I, EDWARD D. MACKINTOSH, of the borough of Brooklyn, in the city of New York, county of Kings, and State of New York, have invented a new and useful Improvement in Motor-Supports, of which the following is a specification.

The object of my invention is the supporting of motors in such a way that they can follow swinging shafts. An example of the use to which it may be put is the driving of self-balancing centrifugal machines.

Referring to the accompanying drawing, forming part of this specification, Figure 1 is a front view of a motor with my improved support, Fig. 2 is a side view of the same, and Fig. 3 is a top view of a part shown in the other two views.

1 is a motor having two bearings 2 for its shaft 3. This shaft is normally vertical, is supported by the motor through the medium of a third bearing 4, and is adapted to carry the basket of a centrifugal machine, or other load, at its lower end. The motor has two ribs 5 which act as rockers and rest on two beams 6. These beams bear the weight of the entire motor, the shaft, and all parts carried by the latter. They are themselves supported by two hangers 7. The beams, the hangers, and the rockers, are all notched together to prevent excessive displacement of any one in relation to the others. The hangers have nuts 8, at their upper ends, bearing on washers 9, and these are supported by lugs 10 forming parts of supports 11. These supports are stationary and can be supported in any suitable manner, say by bolting them to two angle bars 12, as shown in Fig. 2. The holes in the lugs 10 and in the washers 9, through which the upper ends of the hangers pass, are larger than the latter, and the washers are rounded on their upper and lower faces in directions which are perpendicular to each other. The hangers are thus free to swing, to a limited extent, in crosswise directions. The beams 6, carried by the hangers 7 in the manner described, form a swingable platform on which the motor is rockable. To prevent the entire motor from rotating it is provided with two projections 13 which form part of its stator and are more or less loosely confined in two notches 14 in the stationary supports 11. These projections are preferably located on a level with the washers 9 and on a line passing through, or above, the center of gravity of the motor. When the shaft swings, say like a conical pendulum, and about the center of gravity of the motor, the latter rocks on the beams and these swing from side to side and back and forth, in crosswise directions.

Having now described my invention, what I claim as new, and desire to secure by Letters Patent, is:

1. A normally vertical motor supported by rockers, stationary supports on opposite sides of the motor, swingable hangers depending from the stationary supports, and a platform swingably supported by the hangers and supporting the motor through the rockers.

2. A normally vertical motor supported by rockers, stationary supports on opposite sides of the motor, swingable hangers depending from the stationary supports, a platform swingably supported by the hangers and supporting the motor through the rockers, and stationary means engaging with opposite sides of the motor to prevent its rotation.

In testimony whereof I have signed my name to this specification in the presence of two subscribing witnesses.

EDWARD D. MACKINTOSH.

Witnesses:
  B. VAN NAME,
  M. A. WHITEHOUSE.

Copies of this patent may be obtained for five cents each, by addressing the "Commissioner of Patents, Washington, D. C."